(12) United States Patent
Anthony et al.

(10) Patent No.: US 8,239,381 B2
(45) Date of Patent: *Aug. 7, 2012

(54) SYSTEM AND METHOD FOR DYNAMICALLY GENERATING A SELECTABLE SEARCH EXTENSION

(75) Inventors: Colin R. Anthony, Bothell, WA (US);
Richard M. Banks, Egham (SY);
Marieke I. Watson, Seattle, WA (US);
Cornelis K. Van Dok, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,307

(22) Filed: Sep. 20, 2011

(65) Prior Publication Data

US 2012/0072468 A1   Mar. 22, 2012

Related U.S. Application Data

(63) Continuation of application No. 10/887,085, filed on Jul. 9, 2004, now Pat. No. 8,024,335.

(60) Provisional application No. 60/566,947, filed on May 3, 2004.

(51) Int. Cl.
*G06F 7/00* (2006.01)
(52) U.S. Cl. .................. 707/729; 707/765; 715/809
(58) Field of Classification Search ............. 707/729, 707/765
See application file for complete search history.

(56) References Cited

U.S. PATENT DOCUMENTS

| | | | | |
|---|---|---|---|---|
| 4,214,141 A | * | 7/1980 | Okuda et al. ............. | 219/73 |
| 4,438,505 A | * | 3/1984 | Yanagiuchi et al. ....... | 704/7 |
| 4,829,423 A | * | 5/1989 | Tennant et al. .......... | 704/8 |
| 4,881,179 A | * | 11/1989 | Vincent ................ | 358/1.14 |
| 4,931,935 A | * | 6/1990 | Ohira et al. ............ | 704/8 |
| 5,060,135 A | * | 10/1991 | Levine et al. ........... | 715/769 |
| 5,787,413 A | | 7/1998 | Kauffman et al. | |
| 6,317,777 B1 | | 11/2001 | Skarbo et al. | |
| 6,374,260 B1 | | 4/2002 | Hoffert et al. | |

(Continued)

FOREIGN PATENT DOCUMENTS

CN   1239239 A   12/1999

(Continued)

OTHER PUBLICATIONS

Final Notice of Preliminary Rejection in KR Application 10-2006-7023102 mailed Feb. 6, 2012, 4 pp. w/English translation.

*Primary Examiner* — John R. Cottingham
*Assistant Examiner* — Nirav K Khakhar
(74) *Attorney, Agent, or Firm* — Shook, Hardy & Bacon L.L.P.

(57) ABSTRACT

A system and related techniques accept user-inputted search terms, for example to perform a search for files or other data or objects. According to embodiments, an extension of a search to different levels or points in the file system hierarchy may be automatically generated and presented to the user as a selectable search box. That box may be highlighted to the user for easy selection. When the user selects the selectable search box, the user's search for files of type or extension ".doc" or ".memo", may be seamlessly extended to other files, folders, trees or other points or levels in the file system hierarchy. Search results may be continuously or dynamically updated as the user enters more characters or other data.

20 Claims, 4 Drawing Sheets

U.S. PATENT DOCUMENTS

| | | |
|---|---|---|
| 6,496,837 B1 | 12/2002 | Howard et al. |
| 6,725,227 B1 | 4/2004 | Li |
| 6,869,018 B2 | 3/2005 | Fifield |
| 6,973,618 B2 | 12/2005 | Shaughnessy et al. |
| 7,171,468 B2 | 1/2007 | Yeung et al. |
| 7,590,625 B1 | 9/2009 | Tennican et al. |
| 7,692,807 B1 | 4/2010 | Sanders et al. |
| 7,890,543 B2 | 2/2011 | Hunt et al. |
| 7,917,538 B2 | 3/2011 | Gurevich |
| 2002/0156792 A1 | 10/2002 | Gombocz |
| 2003/0110397 A1 | 6/2003 | Supramaniam et al. |
| 2004/0146272 A1 | 7/2004 | Kessel et al. |
| 2004/0162838 A1 | 8/2004 | Murayama et al. |
| 2005/0091612 A1 | 4/2005 | Stabb et al. |
| 2005/0114330 A1 | 5/2005 | Chau |
| 2005/0131760 A1 | 6/2005 | Manning et al. |
| 2008/0208927 A1 | 8/2008 | Chikusa et al. |

FOREIGN PATENT DOCUMENTS

| | | |
|---|---|---|
| NO | 20042743 A | 8/2004 |
| WO | 2004008348 | 1/2004 |

* cited by examiner

SYSTEM AND METHOD FOR DYNAMICALLY GENERATING A SELECTABLE SEARCH EXTENSION

CROSS-REFERENCE TO RELATED APPLICATIONS

This application is a continuation of U.S. patent application Ser. No. 10/887,085, filed Jul. 9, 2004, issued as U.S. Pat. No. 8,024,335 on Sep. 20, 2011, entitled "System and Method for Dynamically Generating a Selectable Search Extension," which claims the benefit of priority to U.S. Provisional Patent Application Ser. No. 60/566,947 filed May 3, 2004, entitled "System and Method for Dynamically Generating a Selectable Search Extension." The subject matter of this application is related to the subject matter of U.S. patent application Ser. No. 10/440,035 entitled "System and Method for Filtering and Organizing Items Based on Common Elements" filed May 16, 2003, which is in turn a continuation-in-part of U.S. patent application Ser. No. 10/403,341 entitled "System and Method for Filtering and Organizing Items Based on Common Elements" filed Mar. 27, 2003, each of which applications is assigned or under obligation of assignment to the same entity as this application, and each of which applications is incorporated by reference herein.

STATEMENT REGARDING FEDERALLY SPONSORED RESEARCH OR DEVELOPMENT

Not applicable.

FIELD OF THE INVENTION

The invention relates to the field of computing, and more particularly to a platform for automatically generating a selectable search as a user inputs search terms, for instance matching file attributes or content to files in a file system, which search may be presented in word-wheel style and expand the level of directories or other point or level in file hierarchies in which the search may be performed.

BACKGROUND OF THE INVENTION

In the realm of operating system, application design and other fields, the need for a powerful and flexible search facility to search a user's storage frequently arises. A user may wish, for example, to search his or her hard drive to locate all files of a certain type or extension, such as ".doc", ".jpg", ".memo", ".report" or others to pull up documents to edit, print other manipulate in other ways. A user may likewise wish to search for files based on associated metadata, such as file size, or date created or modified. A user may at times also choose to search for files based on internal file content, such as desired text or numbers. The need to efficiently initiate and carry out these searches becomes particularly acute when the user is attempting to look through a large quantity of files or data. That situation may apply for example when a user is examining a national customer list in a CRM package, or updating contacts files or shared documents within a large corporation or other organization. In other cases, a user may wish to sort or search through a collection or catalogue of musical, video or other media or file material. Some search tools and facilities have evolved in response to large-scale file search and other requirements.

For example, some applications and other packages may present the user with an input box type of search interface, where the user may enter search terms such as file extensions or other attributes, or in-file characters or text. As the search, for example through a local hard drive and associated file system, progresses, files which partly or fully match the entered attributes or text may be displayed to the user to select or manipulate.

However, existing search tools may be constrained by certain limitations in usability or functionality. For instance, even such search tools as exist merely present the results gathered from searching the client or other file system at the current level or point in the file system hierarchy. So if no results are found in a given directory or folder, the user may be required to restart and reenter another search in another directory or folder, even when using the same search terms. Likewise, existing search tools do not permit the concurrent execution of searches on both file attributes (extension, name etc.) as well as deep or internal file searching, for instance to match text strings. Other problems in file management and search technology exist.

SUMMARY OF THE INVENTION

The invention overcoming these and other problems in the art relates in one regard to a system and method for dynamically generating a selectable search extension, in which a user may initiate a search through a file system based on file attributes or content at a current level or point in a file system hierarchy. In embodiments, the inventive platform may automatically generate on-the-fly results reflecting matches with files within the current level or point of the file system hierarchy. For example the platform may display a running total of files whose name, date, size, author or other attributes or textual or other content match the input search term or terms as the user enters those terms. According to embodiments of the invention in another regard, when the immediate results to the user's input search terms displays no or too few matches to any files in the current level or point in the file system hierarchy, or based on other conditions, a selectable search box may be automatically generated and presented. In embodiments the search box may dynamically suggest auto-complete strings for suggested or candidate search terms. The selectable search box may in embodiments be presented to the user in highlighted form, and permit the user to extend the search using the same search input or criteria to other levels by clicking or otherwise selecting a different level or point in the file system hierarchy, which may be highlighted or presented in a menu interface for quick activation.

DETAILED DESCRIPTION OF EMBODIMENTS

Figure 1:
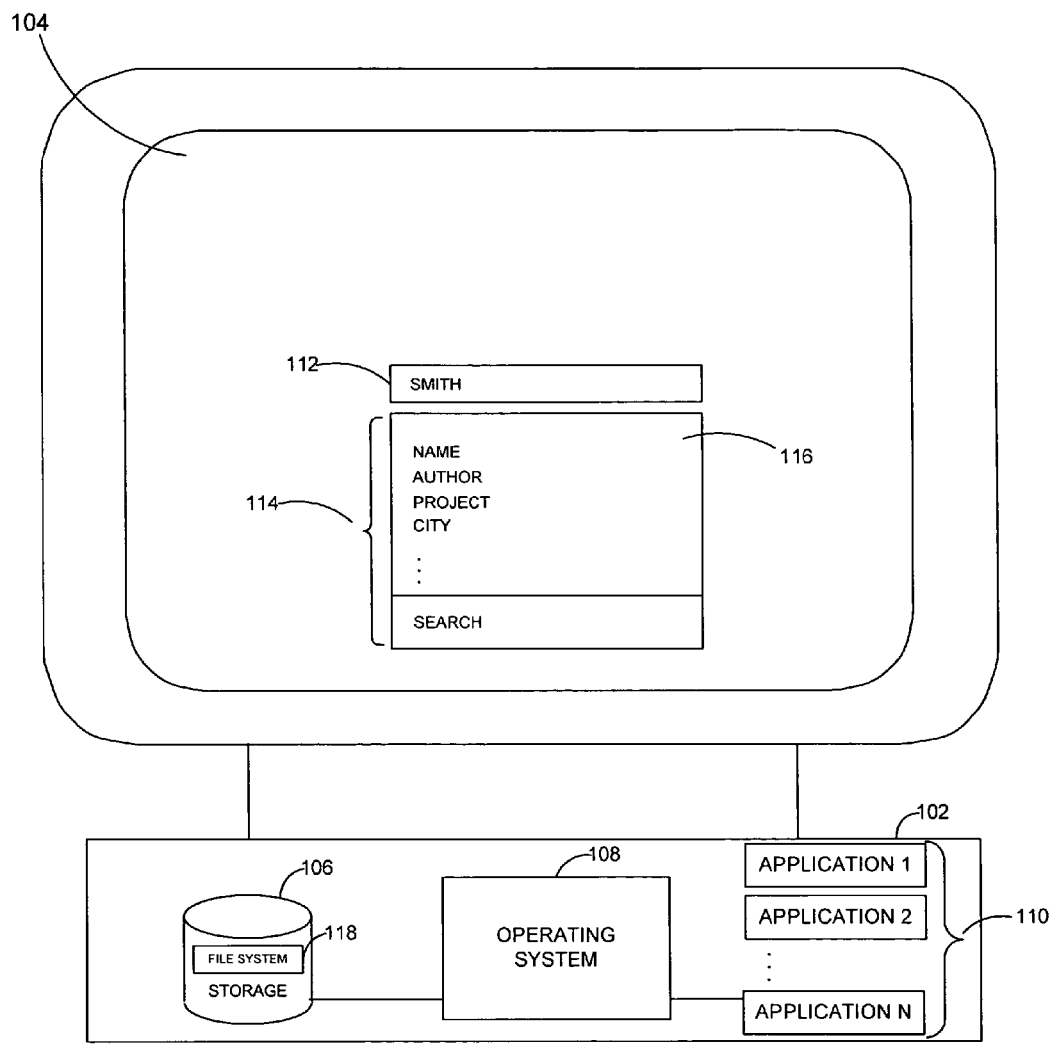
FIG. 1 illustrates a platform in which a system and method for dynamically generating a selectable search based on input search terms may operate, according to embodiments of the invention.

FIG. 1 illustrates an architecture in which a system and method for may operate, according to an embodiment of the invention. As illustrated in that figure, a user may use a manipulate a user interface 104 on a client 102 under control of an operating system 108, for instance to operate one or more applications in a set of applications 110 and perform other tasks. Client 102 may include storage 106 such as a hard drive, optical drives such as a CD-ROM or DVD-ROM, electronic media or other media or storage. In embodiments, the storage 106 may include a file system 118, which system may physically or logically encode programs and data stored on storage 106, such as for example in a directory, file, library, tree or other hierarchical or other structure. According to embodiments of the invention, the file system 118 may be or include the Windows™ File System (WFS) incorporated in succeeding generations of the Microsoft Windows™ family of operating systems. Other file systems, operating systems and related resources may be used.

During operation and use of client 102, the user may access storage 106 and file system 118 to perform such tasks as locating, opening, modifying and saving files and other objects. The tasks the user may engage may include searching for one or more files or other objects, for instance to open those files using one or more application in the set of applications 110, to enumerate a set of local files, for example to generate a total count of numbers of files of certain type, to locate and delete obsolete files, or other purposes or tasks. According to embodiments of the invention in one regard, the user may manipulate the user interface 104 to initiate and perform file searching tasks, for instance using one or more facilities, file types, objects or other features incorporated in or supported by operating system 108.

In embodiments as shown, the user may accordingly activate a search term input box 112, for instance by making a file menu selection within one or more screens in operating system 108, such as those screens or views generated by clicking or activating "MyComputer" or other icons, sidebars, menus or other resources. The user may respond to the search term input box 112 by entering one or more search terms related to a file or files of interest. For example, the user may wish to view all files with desired attributes, such as files having a ".doc", ".memo", ".report", ".txt", ".jpg" or other extension, or which were authored by a given user or on a certain date. Other extensions or attributes are possible, such as the time, language, file size, or other attribute of one or more files within file system 118. A user may in another regard likewise search for files within file system 118 based on the internal text, character, numbers or other content of those files, and enter those search terms accordingly. Search terms, data structures and related resources may in embodiments be, include or interface to for example those described in the aforementioned U.S. patent application Ser. No. 10/440,035 and U.S. patent application Ser. No. 10/403,341, or other search schemes or mechanisms.

Figure 2:
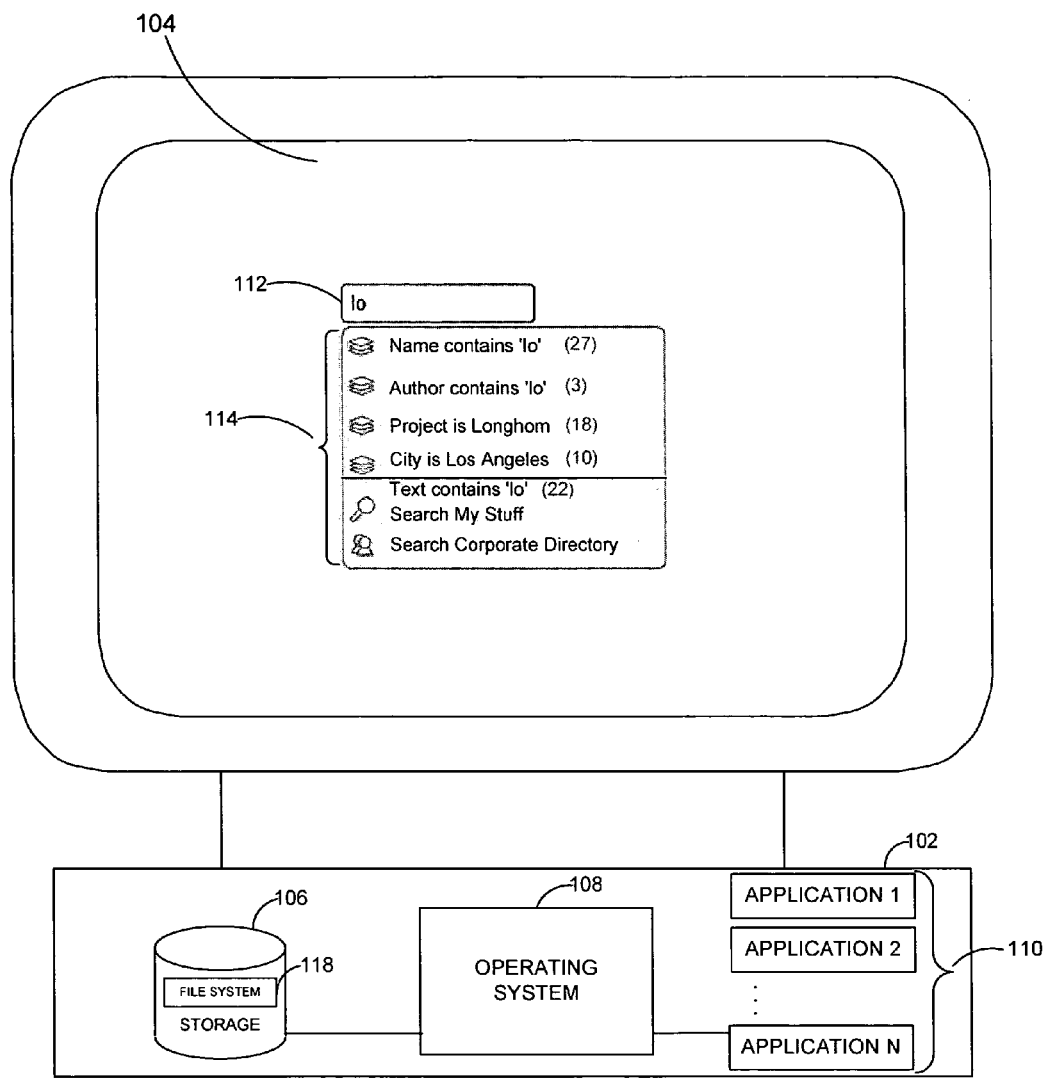
FIG. 2 illustrates a search facility or interface including an input search box, according to embodiments of the invention.

As illustrated in FIG. 2, according to embodiments of the invention in one regard, as the user begins to enter one or more search terms in the search term input box 112, the system may respond by automatically generating and presenting a search box 114. The search box 114 may reflect search activity and logic in response to the inputted search terms. According to embodiments as shown, the search box 114 may include, for example in an upper portion of a menu panel, a listing of a set of attributes for files which match the inputted search term or partial search term. According to embodiments, the listing of the set of attributes may be generated in an on-the-fly, immediate or real-time fashion so that as each new letter, character, number or other symbol in the search term is typed in or otherwise entered, the results may be immediately displayed.

In embodiments as shown, the on-the-fly results may include a parenthetical tally of the total number of files matching the inputted search term or partial search term, up to that moment in time. It may be noted that as illustrated in FIG. 2, when for example more than one property value matches the search string or term, the user may be presented with a menu entry indicating that the property "contains" the search string or term, such as "Name contains 'lo'" as shown. That is, in the illustrative example multiple names in the view may contain the string 'lo', e.g., "Logan", "Lorraine", "Lomar" or others. On the other hand, when there is only one unique property in the view which matches the search string or term, the user may be presented with a menu entry indicating that the property "is" the search string or term, such as "City is Los Angeles" as shown. Other interfaces and formats for displaying results are possible.

According to embodiments of the invention in one regard, the on-the-fly search results on file attributes may be generated from searching files displayed in the current list. In embodiments those files may be located in a single directory or location, or across multiple locations. As further illustrated in FIG. 2, while the on-the-fly search activity is taking place on file attributes, according to embodiments additional search activity may be initiated. More particularly, as illustrated the search box 114 may present in a lower menu section or otherwise a set of further search resources, in the exemplary case including one or more lines indicating internal (or deep) file searching which may take place concurrently or sequentially with the on-the-fly searching on file attributes. In the illustrative example, files at the current point or level of file system 118 may thus be examined for internal text ("lo") as that text is inputted by the user. Files containing that text string may be located and presented in the search box 114 as they are located. The speed with which the internally searched hits may be generated may vary according to the number of files in the current point or level in the file system 118, the input search terms, the type or existence of indexing on that file system or other factors.

Thus according to the invention in one regard, the user who initiates search activity may be presented with a multipart view on results in real-time as they are generated, including results of matching on file attributes (illustratively, the upper half of the search box 114) and on internal file content (bottom half), at the same time and without having to activate any additional options to do so.

Figure 3:
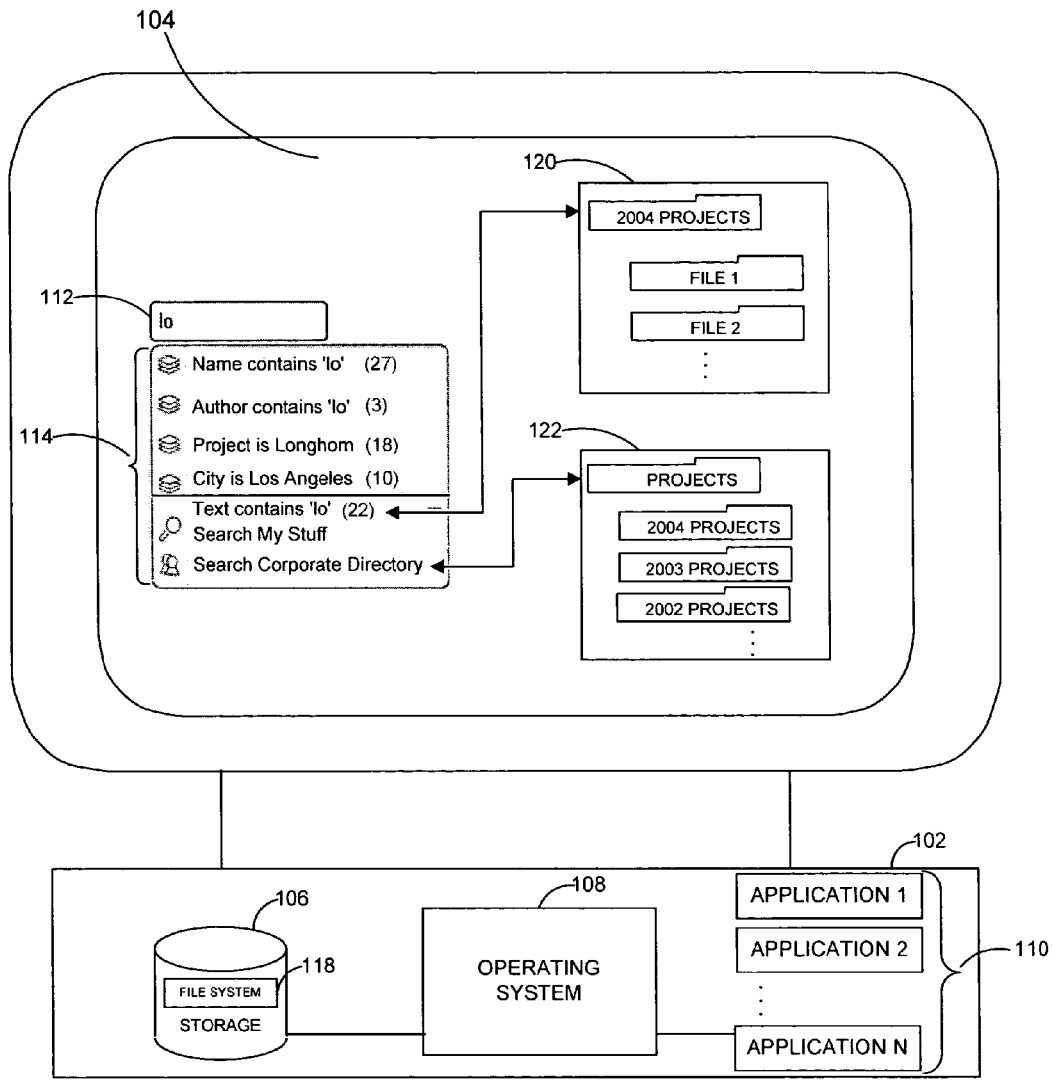
FIG. 3 illustrates a search facility or interface according to embodiments of the invention in another regard, including multi-level searching.

Moreover, according to embodiments of the invention in further regards, as the results presented in the search box 114 unfold, the user may be presented with further automatic options to extend their search activity, to different points or levels of file system 118 or otherwise. In such cases and as more particularly illustrated in FIG. 3, according to embodiments of the invention the system may return the results of searching at a current level 120 of file system 118. Those results may accompanied by a presentation in search box 114 of automatically generated search extensions or options. In embodiments as shown, those extensions may include the highlighting of a different or modified level 122 or other point or location in file system 118 to which the same search terms inputted by the user may be applied, in an attempt to locate more or further matching files or other hits.

The user may for example highlight the modified level 122, such as a corporate directory or organizational contacts list, personal file folder or library, most-recently accessed file list, or other modified or different point or level in the file system 118 to activate that further searching in that location. The results of that continued or extended searching may likewise be presented in search box 114, or otherwise. The modified level 122 may be selected for example based on predetermined relational rules, such as moving one up or down one level in file system 118, by logical rules such as moving to directories with matching or related names or which stand in parent, child or other relationship to the current level 120, by defaults such as looking in a most-recently accessed files list, or by other rules or criteria.

The search options presented to the user may thus be automatically primed to look in further predetermined or logically related places in the file system 118, without a need for the user to manually change the directory or other hierarchical level they are viewing. In embodiments, the presentation of search extension options may be automatically presented, regardless of the amount or type of results at current level 120 of file system or other parameters. In other embodiments, the triggering of search extension options in search box 114 may be conditioned on defined criteria, such as when searching on attributes and content based on whole or partial search terms generates no matching results, or fewer hits than the user finds necessary. In embodiments the user may enter minimum thresholds or they may be set by default. Other triggering conditions are possible.

Figure 4:
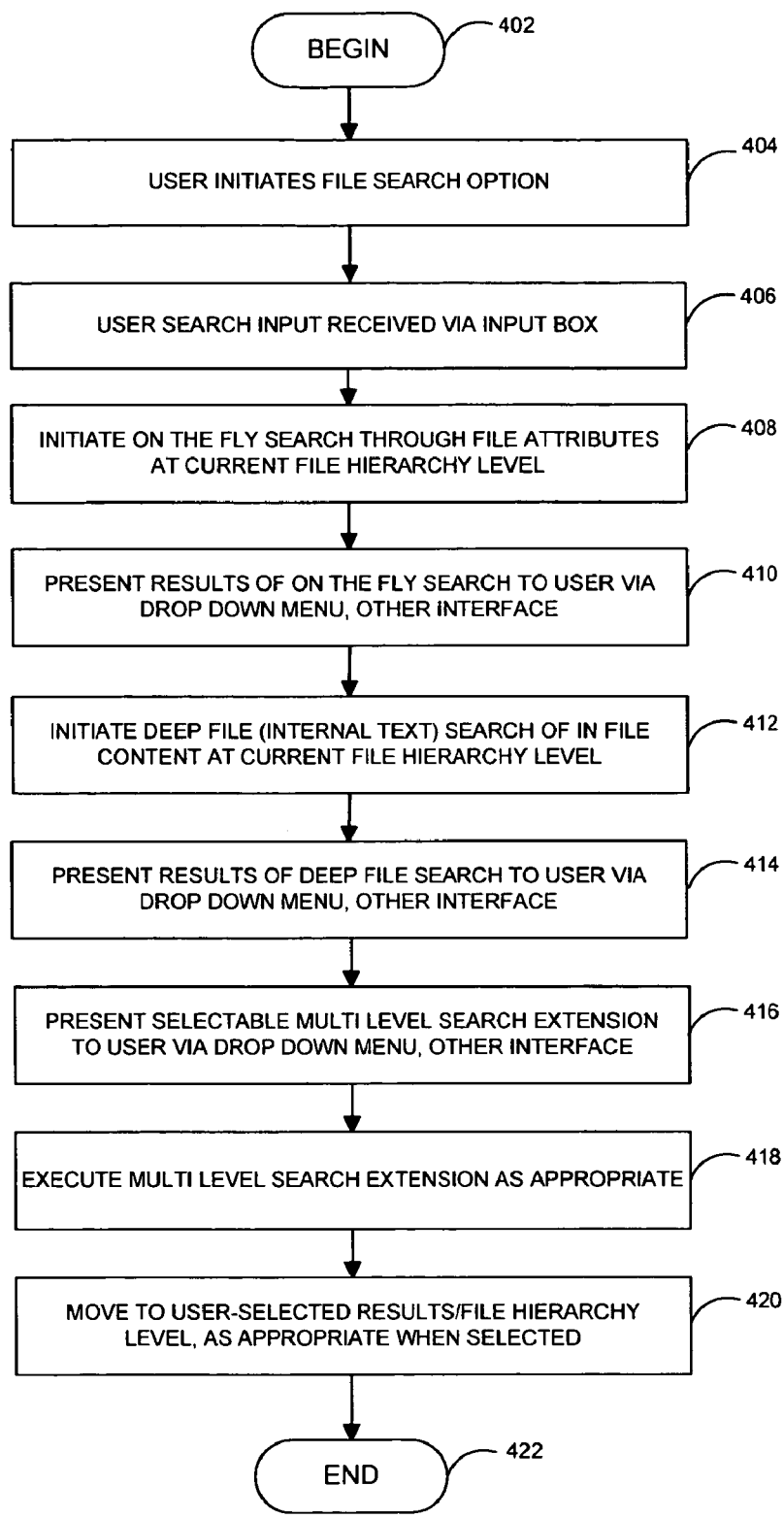
FIG. 4 illustrates a flowchart of overall search extension processing, according to embodiments of the invention.

FIG. 4 illustrates overall search and file management processing, according to embodiments of the invention. In step 402, processing may begin. In step 404, a user may initiate a file search option, for example by selecting a file management toolbar in an operating system, by selecting a file search facility in an application which in turn calls operating system resources, or by other menus or selections. In step 406, user input may be received via search term input box 112 or other interfaces, for example receiving typed search terms. In step 408, on-the-fly search activity may be initiated to search for file attributes at a current level in the file system 118, such as in a current directory, folder or other point or level in the file system hierarchy, based on the user input. For example all files with extension ".memo" or authored by "Smith" may be searched and sorted at the current point or level in the file system 118.

In step 410, the running results of the on-the-fly search on attributes at the current level in file system 118 may be presented to the user, for example via a search box 114, in word-wheel type fashion or otherwise. In step 412, a sequential or concurrent deep file search, for instance involving opening and searching files internally, or indices of files, for text or strings matching the user input, may be initiated at the current point or level in the file system 118, for example within a current directory or folder.

In step 414, results of the on-the-fly deep searching on internal file content may be presented to the user, for example via the search box 114, for instance separated from the real-time search results based on file attributes by a menu separator or line. In step 416, depending on the results of the on-the-fly attribute and/or deep file searching, the user may be presented with a selectable search extension box, to extend the search based on the currently inputted search terms to other points or levels in the hierarchy of file system 118.

In step 418, an extension of the search to a different point or level in the file system 118 may be initiated, for instance when the user activates a highlighted directory, file or other prompt in search box 114. In embodiments the same search terms which the user had inputted into the search term input box 112 may be pre-inserted into the highlighted portion of the search box 114, or otherwise. On-the-fly results may in embodiments be similarly presented via search box 114 as the multi-level extension to the search activity progresses.

In step 420, the view in search box 114 or other interface may be updated to display user-selected or highlighted files or other results, for example a clicked or highlighted file or set of files located in a different level of the file system 118. Files may be opened, sorted or otherwise manipulated when the view moves to the new point or level in the file system 118. Prior levels may be stored or displayed as shadowed directories, folders or other objects, in embodiments. In step 422, processing may repeat, return to a prior processing point, jump to a further processing point, or end.

The foregoing description of the invention is illustrative, and modifications in configuration and implementation will occur to persons skilled in the art. For instance, while the invention has generally been described in terms of a platform in which an interface displays a single search box or facility, in embodiments multiple search boxes or other interfaces, for example cascaded search boxes, may be generated as matches or partial matches are found.

Similarly, while the invention has in embodiments been generally described as executing searches on local hard disk or other storage, in embodiments the automatic searches may be performed on one or more local, remote or distributed storage or file systems, independently or in combinations. For example, a remote server disk may be searched, or a local hard disk may be searched in combination with a storage area network (SAN). Multiple local disks or other media may likewise be searched, serially or concurrently.

Other hardware, software or other resources described as singular may in embodiments be distributed, and similarly in embodiments resources described as distributed may be combined. Further, while the invention has generally been described as involving on-the-fly searches based on a single search term as that string or term is typed, in embodiments multiple or joint search terms may be accepted for searching, for instance using Boolean operations. The scope of the invention is accordingly intended to be limited only by the following claims.

We claim:

1. A method for automatically presenting a search interface facility on a display comprising:
   receiving a search criteria;
   determining that a first amount of files within the file location have file content that matches the search criteria, wherein the file content is the subject matter of a file;
   determining that a plurality of attributes associated with one or more files have a file attribute value that matches the search criteria, wherein a file attribute is a characteristic of the file;
   for each of the plurality of attributes, determining how many files contain an attribute value that matches the search criteria; and
   outputting for display a search box having a first panel and a second panel, wherein the first panel displays each of the plurality of attributes with an indication adjacent to each of the plurality of attributes, wherein the indication communicates how many times an attribute displayed adjacent to the indication has an attribute value for a file that matches the search criteria, and wherein the second panel displays the first amount of files that have file content that matches the search criteria.

2. The method of claim 1, wherein the search box includes a third panel showing a graphical representation of a folder hierarchy, and wherein the graphical representation may be dynamically selected by a user to specify a file location to be searched.

3. The method of claim 1, wherein the attribute is a file type.

4. The method of claim 1, wherein the search results are received through a graphical user interface.

5. The method of claim 1, wherein the method further comprises:
   receiving a new search criteria; and
   dynamically updating the first panel and the second panel upon receiving the new search criteria.

6. The method of claim 1, wherein the method further comprises receiving indication of a new hierarchical level in the file system to be searched using the new search criteria.

7. The method of claim 6, wherein the method further includes:
   determining that a second amount of files within the new hierarchical level in the file system have file content that matches the search criteria;
   determining that a plurality of attributes associated with one or more files in the new hierarchical level in the file system have a file attribute value that matches the search criteria;
   for each of the plurality of attributes, determining how many files in the new hierarchical level in the file system contain an attribute value that matches the search criteria; and
   outputting for display a search box having the first panel and the second panel, wherein the first panel displays each of the plurality of attributes with an indication adjacent to each of the plurality of attributes, wherein the indication communicates how many times an adjacent attribute has an attribute value for a file in the new hierarchical level in the file system that matches the search criteria, and wherein the second panel displays the first amount of files within the new hierarchical level in the file system that have file content that matches the search criteria.

8. A method of generating and displaying search results comprising:
   receiving a first input symbol;
   searching a set of files in a file system to generate a first plurality of files that have one or more file attribute values that match the first input symbol and a second plurality of files that have file content that matches the first input symbol;
   outputting for display a first interface that displays one or more file attributes that are associated with the one or more file attributes values from the first plurality of files and at least how many files in the second plurality of files are associated with each attribute that has an attribute value that matches the first input symbol and a second interface that displays how many files are in the second plurality of files;
   receiving a second input symbol;
   searching the set of files to update the first plurality of files to include files that have one or more file attribute values that match the first input symbol and the second input symbol and the second plurality of files to include the files that have file content that matches the first input symbol and the second input symbol; and
   updating the first interface based on the updated first plurality of files and the second interface based on the updated second plurality of files.

9. The method according to claim 8, wherein the receiving of the first and second input symbols comprises receiving the first and second input symbols via a graphical user interface.

10. The method of claim 8, wherein the method further comprises receiving indication of a new file location to be searched using the new search criteria.

11. The method of claim 10, wherein the method further comprises:
   searching the new file location to generate a third plurality files that have one or more file attribute values that match the first input symbol and the second input symbol;
   searching the new file location to generate a fourth plurality files that have file content that matches the first input symbol and the second input symbol; and
   updating the first interface based on the third plurality of files and the second interface based on the fourth plurality of files.

12. The method of claim 8, wherein the file attribute is a file type.

13. The method of claim 12, wherein the file attribute indicates the file type is a music file.

14. One or more computer-storage media with computer-executable instructions embodied thereon, that when executed by a computing device performs a method for automatically presenting a search interface facility on a display, the method comprising:
   outputting for display an input interface to sequentially receive a first input symbol and a second input symbols;
   searching file content and file attribute values associated with a set of files in a file system;
   outputting for display an interface in response to receiving the first input symbol with a first panel showing first results based on results of matching the first input symbol to file attributes of files in the file system, wherein the first panel displays each of the file attributes with an indication adjacent to each of the file attributes, wherein the indication communicates how many times a file attribute displayed adjacent to the indication has an attribute value that matches the first input symbol; and
   outputting for display a second panel on the interface with first results of matching the first input symbol to content of the files in the file system.

15. The computer-storage media of claim 14, wherein the method further comprises outputting for display a graphical representation of a folder hierarchy that is selectable by a user to designate the file system to be searched.

16. The computer-storage media of claim 15, wherein the method further comprises receiving a selection of a new file system to search.

17. The computer-storage media of claim 16, wherein the method further comprises updating the first results to include only files in the new file system.

18. The computer-storage media of claim 14, wherein the file attribute value indicates a file is a music file.

19. The computer-storage media of claim 14, wherein the file attribute value indicates a file is a video file.

20. The computer-storage media of claim 14, wherein the file attribute value indicates a file is an email file.

* * * * *